June 21, 1927.

H. T. HERR 1,632,896

EXHAUST DEVICE FOR ENGINES

Filed Dec. 31, 1920

Herbert T. Herr
INVENTOR

BY
ATTORNEY

Patented June 21, 1927.

1,632,896

UNITED STATES PATENT OFFICE.

HERBERT T. HERR, OF MERION, PENNSYLVANIA, ASSIGNOR TO WESTINGHOUSE ELECTRIC AND MANUFACTURING COMPANY, A CORPORATION OF PENNSYLVANIA.

EXHAUST DEVICE FOR ENGINES.

Application filed December 31, 1920. Serial No. 434,368.

My invention relates to internal combustion engines and has particular reference to scavenging mechanisms for internal combustion engines of the four-cycle type.

An object of my invention is to provide an improved and efficient scavenging device for internal combustion engines of the four-cycle type in which the heat of the engine is utilized to effect the scavenging operation.

A further object is to increase the efficiency of an internal combustion engine of the four-cycle type by providing a pressure below atmospheric within the cylinder during the exhaust stroke of the engine, thus converting the exhaust stroke into a secondary work stroke.

These and other objects, which will be made apparent throughout the description of my invention, are attained by means of the apparatus described herein and illustrated in the accompanying drawings in which—

It has heretofore been proposed to increase the efficiency of an internal combustion engine by a thorough scavenging of the engine cylinders, and in engines of the Diesel type, it is highly important that the burned gases be as completely removed as possible. This has been commonly accomplished in internal combustion engines of the four-cycle type by permitting the piston on the exhaust stroke to force the burned gases from the cylinder. In some cases it has been proposed to scavenge the clearance space by supplying air under pressure to the engine cylinder, the best results being obtained by air entering at from five to ten pounds gage pressure. This specific type of scavenging necessitates the use of air compressors which decrease the overall efficiency of the engine and are a source of considerable trouble in their mechanical upkeep. My invention accomplishes the scavenging of an engine cylinder by reducing the pressure within the cylinder to from six to ten pounds below atmospheric pressure. This method not only thoroughly scavenges the cylinder and the clearance space but accomplishes a net gain in work during the exhaust stroke. The latter result is due to the fact that the higher atmospheric pressure acts upon the outer surface of the piston while the pressure within the cylinder acting upon the inner surface of the piston is at a considerably lower pressure.

The energy necessary to produce this condition of low pressure within the cylinder during the exhaust stroke is furnished by the heat in the engine walls, which is normally dissipated in the cooling system. The cooling water is circulated through the engine jacket and the steam thus generated is utilized to operate an ejector which maintains a chamber at a low, sub-atmospheric pressure. The exhaust manifold is in communication with this chamber so that a low pressure is maintained within the exhaust manifold. The apparatus comprising a low-pressure chamber and an ejector cooperates with the engine piston only on the exhaust stroke; that is, during three strokes of the engine cycle,—the suction stroke, the compression stroke, and the working stroke—, the exhaust valve is closed and the ejector operates during these strokes only to create and maintain a vacuous condition within the low-pressure chamber.

It will be seen from the above description that an efficient scavenging device is provided which not only does not impose a load upon the engine, but actually adds to the mean effective power of the engine.

Figure 1:
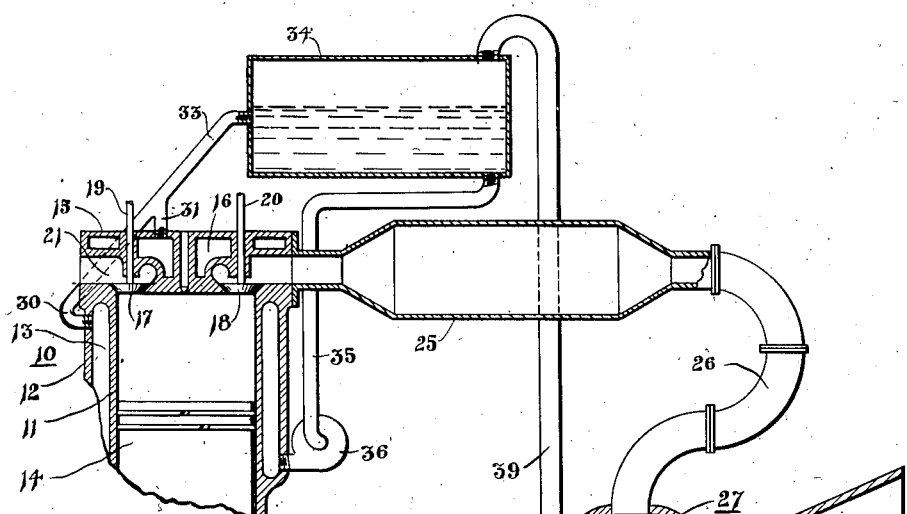
Figure 1 is a longitudinal sectional view of an internal combustion engine equipped with a scavenging mechanism.

Referring to the drawing, I have illustrated in Figure 1 an internal combustion engine 10 having a cylinder 11 surrounded by a jacket 12 to provide a water chamber 13. A piston 14 is arranged to reciprocate within the cylinder 11. Power is transmitted from the piston 14 by any convenient mechanisms, the illustration and description of which are here omitted since they form no part of my invention. A cylinder head 15 is secured to one end of the cylinder 11 and is preferably provided with water chambers 16. The cylinder head is also provided with an inlet valve 17 and an exhaust valve 18, the valves being operated in timed relation to the movements of the engine piston by means of valve stems 19 and 20, respectively, which may be operatively connected in any suitable manner to moving parts of the engine. Air or a carbureted mixture is supplied to the cylinder 11 through a conduit 21 and valve 17. The exhaust gases, discharged through the valve 18, are delivered to a chamber 25 which is preferably of greater capacity than the cylinder 11. From the chamber 25 the exhaust gases are led by means of a conduit 26 to an ejector 27.

Conduits 30 and 31 communicate with the upper portions of the water chambers 13 and 16 and lead through a conduit 33 into a steam-separating chamber 34. A conduit 35 leads from the lower portion of the steam-separating chamber 34 to the lower portion of the chamber 13. A pump 36 may be interposed within conduit 35 for producing a continuous circulation of water through the engine jacket and steam-cooling chamber. It is obvious, however, that a circulation of water would be maintained without the use of the pump and I may provide a by-pass conduit equipped with a check valve so disposed that water may freely pass from the conduit 35 to the water jacket 13 without passing through the pump. Steam is led from the steam-cooling chamber 34 to a steam chamber 40 of the ejector 27 by means of a conduit 39. Steam is discharged from chamber 40 through nozzles 41 into a diverging portion 42 of the ejector. The mixed fluids are then discharged through a diffuser 43 to the atmosphere.

Having described the arrangement of a device embodying my invention, the operation thereof is as follows: When the engine is placed in operation, the heat transmitted through the cylinder 11 raises the temperature of the water in the jacket 13 and thus produces a circulation of water through the jacket 13, conduit 33, chamber 34 back to the jacket 13. When the water has been sufficiently heated, the steam which forms in the jacket 13 is separated from the water in the chamber 34 and thence delivered to the ejector 27. The continuous discharge of steam through the ejector 27 serves to maintain a relatively low, sub-atmospheric pressure within conduit 26 and the chamber 25 so that upon opening of the exhaust valve 18, the pressure within the cylinder 11 immediately falls below atmospheric pressure. The higher atmospheric pressure acting upon the under side of the piston 14 produces a secondary inward work stroke. The gases thus exhausted into the chamber 25 are removed by the action of the ejector 27 and after valve 18 is closed, the injector serves to restore a high vacuous condition within the chamber 25.

Figure 2:
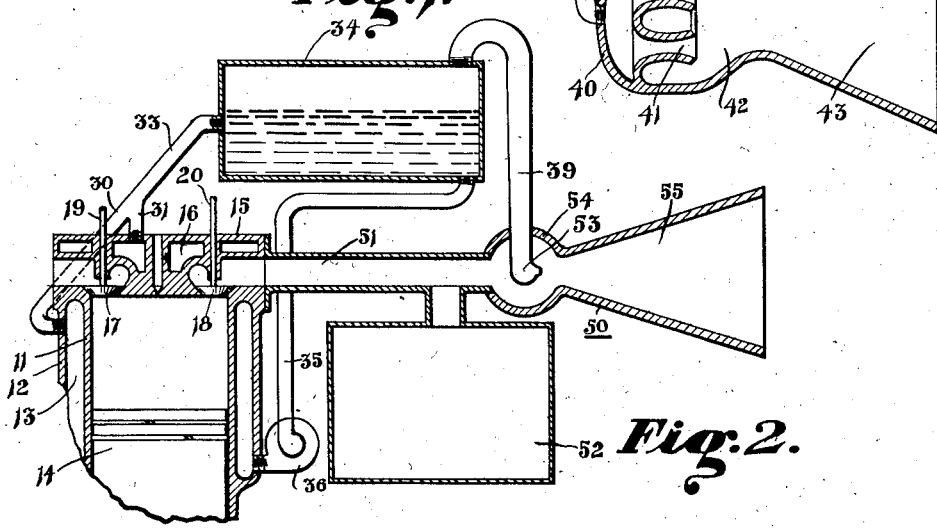
Figure 2 is a longitudinal sectional view of a modification of a construction illustrated in Figure 1.

In Figure 2, I show a slightly modified form of the apparatus illustrated in Figure 1. The construction of the engine, jackets, water circulating system, and the arrangement of the valves are identical with that described above in relation to Fig. 1, and a description thereof need not be here repeated. In this modification, the exhaust gases escaping through the valve 18 are delivered to an ejector 50 through a conduit 51. Communicating with the conduit 51 is a chamber or reservoir 52 of considerably greater capacity than the cylinder 11. Steam is delivered to the ejector 50 through the conduit 39 and the nozzle 53, which is arranged interiorly of and concentrically with the diverging portion 54 of the ejector 50. The steam and gases are finally discharged to the atmosphere through the diffuser 55.

The operation of the apparatus illustrated in Figure 2 differs from that described above in relation to Figure 1 only in the arrangement of the low-pressure chamber or reservoir. In the latter construction, the ejector 5 maintains the chamber 52 in a high-vacuous condition. Upon the opening of the exhaust valve 18, part of the exhaust gases are discharged directly to the ejector 50 and the remainder of the gases are drawn into the chamber 52, the result being an almost immediate fall in pressure within the cylinder 11 to a sub-atmospheric pressure, which is maintained during the entire exhaust stroke by the cooperative action of the ejector 50 and the low-pressure chamber 52.

Figure 3:
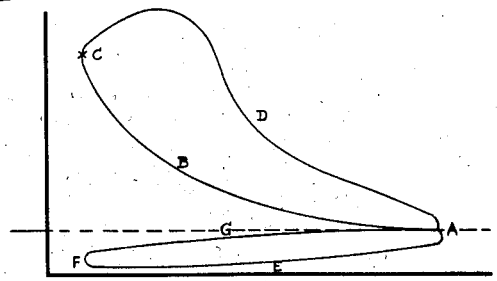
Figure 3 is a pressure-volume diagram of an internal combustion engine operating with my improved scavenging device.

The pressure-volume diagram illustrated in Figure 3 shows the work accomplished both during the combustion or primary work stroke and during the exhaust or secondary work stroke. In this diagram, the line A—B—C represents the compression stroke, the line C—D—A, the combustion stroke, the line A—E—F, the exhaust stroke and the line F—G—A, the suction stroke. It will be apparent from an inspection of this diagram that the added power delivered by my improved engine is represented by the area A—E—F—G, and that since this is accomplished without in any way decreasing the power of the primary work stroke, represented by the area A—B—C—D, the mean effective power of the engine has been increased by an amount equivalent to the power represented by the area A—E—F—G.

It is apparent from the above description of the structure and operation of my improved scavenging mechanism that an increased mean effective power is obtained in a four-cycle internal combustion engine, constructed according to my invention, above described, due to the fact that two of the four strokes of the cycle, viz, the combustion and exhaust strokes, are power strokes and that the added power stroke is occasioned without placing any added load upon the engine. This is accomplished by utilizing the heat energy normally dissipated in the cooling water for maintaining within the cylinder during the exhaust stroke a pressure of from five to ten pounds below atmosphere and by utilizing the higher atmospheric pressure effective against the lower side of the piston to produce a positive work stroke. Moreover, the clearance space in the cylinder is effectively scavenged before the admission of the charge and further increases the effectiveness of the primary work stroke of the engine, particularly if the valve timing is such that the admission valve opens just before the exhaust valve closes.

While I have shown my invention in but two forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:—

1. A means for utilizing heat energy transmitted by the walls of an internal combustion engine having a cylinder with a fuel admission valve and an exhaust valve communicating with one end thereof, comprising water jackets for the walls of the cylinder, a steam separating chamber, means for producing a positive circulation of water through the water jackets and steam separating chamber for generating a continuous supply of steam, a chamber, means for delivering exhaust gases through the exhaust valves to the chamber, an ejector arranged to maintain a sub-atmospheric pressure in the chamber and the exhaust means, and a conduit for delivering a continuous supply of steam from the separating chamber to the ejector, whereby a sub-atmospheric pressure is maintained within the cylinder during the exhaust stroke of the engine for the purpose of producing a secondary power stroke upon the exhaust stroke of the engine.

2. In combination with an internal combustion engine of the four-cycle type, having a cylinder with a fuel inlet valve and a valve-controlled exhaust port in one end of the cylinder, a chamber, means to deliver the burned gases during the exhaust stroke of the engine from the exhaust port to the chamber, an ejector arranged to maintain a sub-atmospheric pressure in the chamber and the exhaust means, a water jacket for the cylinder, a steam-separating chamber, means for producing a positive circulation of water through the water jackets and steam-separating chamber for collecting the steam generated in the cylinder jacket, and a conduit for delivering a continuous supply of steam from the separating chamber to the ejector, whereby a sub-atmospheric pressure is maintained within the cylinder during the exhaust stroke of the engine for the purpose of producing a secondary power stroke upon the exhaust stroke of the engine.

In testimony whereof, I have hereunto subscribed my name this 28th day of December, 1920.

HERBERT T. HERR.